United States Patent
Griseri et al.

(10) Patent No.: US 6,866,422 B2
(45) Date of Patent: Mar. 15, 2005

(54) BEARING-HUB UNIT FOR MOTOR VEHICLE WHEEL

(75) Inventors: Andrea Griseri, Turin (IT); Francesco Savarese, Airasca (IT)

(73) Assignee: SKF Industrie S.p.A., Turin (IT)

( * ) Notice: Subject to any disclaimer, the term of this patent is extended or adjusted under 35 U.S.C. 154(b) by 0 days.

(21) Appl. No.: 09/904,234

(22) Filed: Jul. 12, 2001

(65) Prior Publication Data

US 2002/0015545 A1 Feb. 7, 2002

(30) Foreign Application Priority Data

Jul. 31, 2000 (IT) ..................................... TO2000A0758

(51) Int. Cl.[7] .............................................. F16C 19/08
(52) U.S. Cl. ...................................... 384/537; 384/544
(58) Field of Search ................................ 384/537, 544, 384/513, 564, 569, 585

(56) References Cited

U.S. PATENT DOCUMENTS 6,322,253 B1 * 11/2001 Picca ......................... 384/513

* cited by examiner

Primary Examiner—Lenard A Footland
(74) Attorney, Agent, or Firm—Merchant & Gould P.C.

(57) ABSTRACT

A hub-bearing unit for a motor vehicle wheel comprises a bearing housed in a central axial cylindrical seat of a radially outer annular hub adapted for connection to the wheel of a vehicle. The bearing has an rotating ring the axial width of which is greater than that of the cylindrical seat. The outer ring comprises at least one tubular projection extending axially from one side of the outer ring. The tubular projection comprises an end portion projecting beyond a side surface of the hub and cold deformed in a radially outer direction towards said side surface, so as to lock the outer ring on the hub.

4 Claims, 2 Drawing Sheets

BEARING-HUB UNIT FOR MOTOR VEHICLE WHEEL

BACKGROUND OF THE INVENTION

The present invention refers to a hub-bearing unit for a wheel of a motor vehicle, in particular a utility vehicle, the unit comprising a radially outer annular hub adapted for connection to the wheel of a vehicle, and having a central axial cylindrical seat for a bearing, and a bearing having a radially outer rotating ring mounted in the cylindrical axial seat for rotating fast with the annular hub.

A hub-bearing unit of the above-indicated kind is shown schematically in FIG. 1. With reference to FIG. 1, numeral 10 indicates a radially outer annular hub of steel, forming a radially outer flange 11 with axial holes 12 for connecting the hub to a wheel 14 of a motor vehicle by means of studs 13. The hub has a central axial cylindrical seat 15 in which there is mounted a bearing of the so-called first generation, indicated overall 16. The bearing 16 comprises a stationary radially inner ring 17, a rotating radially outer ring 18, and rolling bodies 19, in this case tapered rollers, radially interposed between the inner 17 and outer 18 rings. The inner stationary ring 17 is locked on a central axle 20 for supporting the wheel; the outer rotating ring 18 is mounted in the cylindrical seat 15 of the hub so as to rotate integral therewith.

According to prior art, the bearing 14 is axially locked in the cylindrical seat 15 of the annular hub by means of a shoulder 10a formed on the outboard side of the hub, and on the inboard opposite side by other locking means, usually consisting of a ring nut or a seeger ring, cooperating with a circumferential groove formed in the hub, or, as in the example of FIG. 1, in a flange of the brake rotor. The outer ring 18 of the bearing is rotationally locked in the cylindrical seat 15 of the hub by a forced coupling with radial interference.

SUMMARY OF THE INVENTION

An object of the invention is to provide a hub-bearing unit of the above-identified type, providing an improved assembling, more reliability and lower costs.

Another object of the invention is to provide a hub-bearing unit of overall lighter weight in comparison with prior art arrangements, and of smaller axial bulk.

These objects are attained, in accordance with the present invention, by a hub-bearing unit for a motor vehicle wheel, the unit comprising:
- a radially outer annular hub adapted for connection to the wheel of a vehicle, and having a central axial cylindrical seat for a bearing;
- a bearing having a radially outer rotating ring mounted in the cylindrical axial seat for rotating fast with the annular hub; wherein the outer ring has an axial width greater than the axial width of the cylindrical seat, the outer ring comprises at least one tubular projection extending axially from one side of the outer ring, and wherein the tubular projection comprises an end portion projecting beyond a side surface of the hub and cold deformed in a radially outer direction towards said side surface, so as to lock the outer ring on the hub.

Preferred embodiments of the invention are defined in the dependent claims.

BRIEF DESCRIPTION OF THE DRAWINGS

The features and advantages of the present invention will be apparent from the detailed description of a few embodiments thereof, with reference to the enclosed drawings, even by way of not-limiting example, in which.

DETAILED DESCRIPTION OF THE PREFERRED EMBODIMENTS

Figure 1:
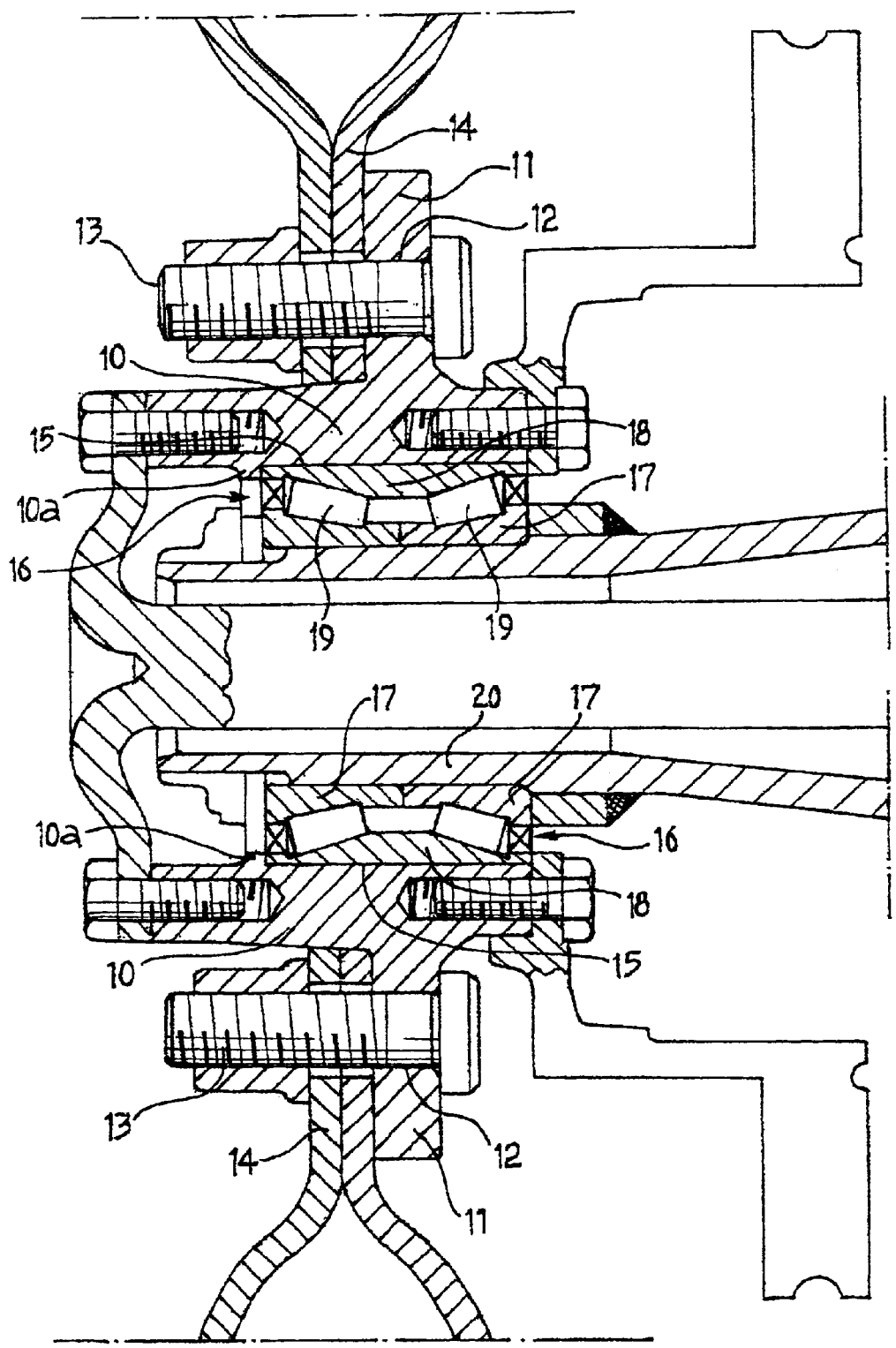
FIG. 1 is an axial cross-sectional view of a hub-bearing unit for a vehicle wheel assembled in accordance with the prior art.
Figure 2:
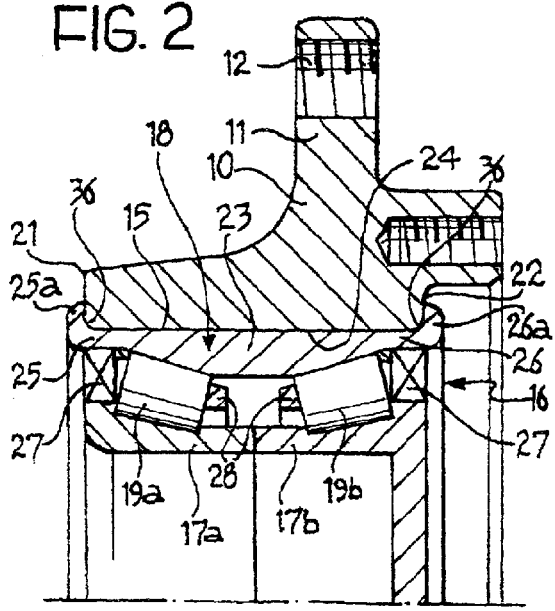
FIG. 2 is a partial axial cross-section view of a hub-bearing unit according to a first embodiment of the present invention.

With reference to FIG. 2 and using the same reference numbers already used for FIG. 1, a hub-bearing unit according to the present invention comprises an annular hub 10 with an axial cylindrical seat 15 in which there is mounted a bearing of the first generation, indicated overall 16.

The cylindrical axial seat 15 extends between an essentially radial surface 21 facing the inboard side of the vehicle and an essentially radial surface 22 facing the outboard side of the vehicle.

The bearing 16 comprises a radially outer rotating ring 18, described in detail hereinafter, a pair of radially inner rings or half-rings 17a and 17b, and two sets of rolling bodies 19a, 19b, in this example tapered rollers, radially interposed between the outer ring 18 and the inner half-rings 17a and 17b.

The general layout of the unit shown in FIG. 2 may be considered generally known. Only the elements of specific importance and interest for the purposes of the implementation of the present invention will therefore be described in detail in the following description. For the construction of the parts and elements not shown in detail, reference may therefore be made to any hub-bearing unit of known kind.

The outer ring 18 of the bearing comprises a main and central annular portion 23, in which there are formed the raceways for the rolling bodies 19a, 19b. The outer ring 18 has an outer cylindrical surface 24 adapted to be inserted in the cylindrical seat 15 of the hub 10. Preferably, the cylindrical seat 15 and the cylindrical surface 24 are dimensioned so as to have some radial interference requiring forced insertion of the bearing in the hub, to obtain a better axial and circumferential locking of the outer bearing ring in the hub.

The outer cylindrical surface 24 extends across the whole axial dimension of the outer ring 18 and has an axial width greater than that of the seat 15.

The two opposite axial ends of the cylindrical surface 24 are provided by respective axial tubular projections 25 and 26 extending from the main cylindrical portion 23. The tubular projections 25 and 26 are formed and dimensioned so as to be plastically cold formed, preferably by rolling, in radially outer directions towards the respective inner 21 and outer 22 side surfaces of the annular hub 10, so that the end portions 25a and 26a of the tubular projections 25 and 26, by projecting beyond the side surfaces 21 and 22 of the annular hub and being folded towards or against such opposite side surfaces, axially lock the outer bearing ring 18 on the hub.

The sequence of the assembling operations of the bearing in the hub provides that a complete bearing unit with outer ring, inner rings and rolling elements, sealing devices 27 and retaining cages 28, is inserted in the cylindrical seat 15 of the hub.

Figure 3:
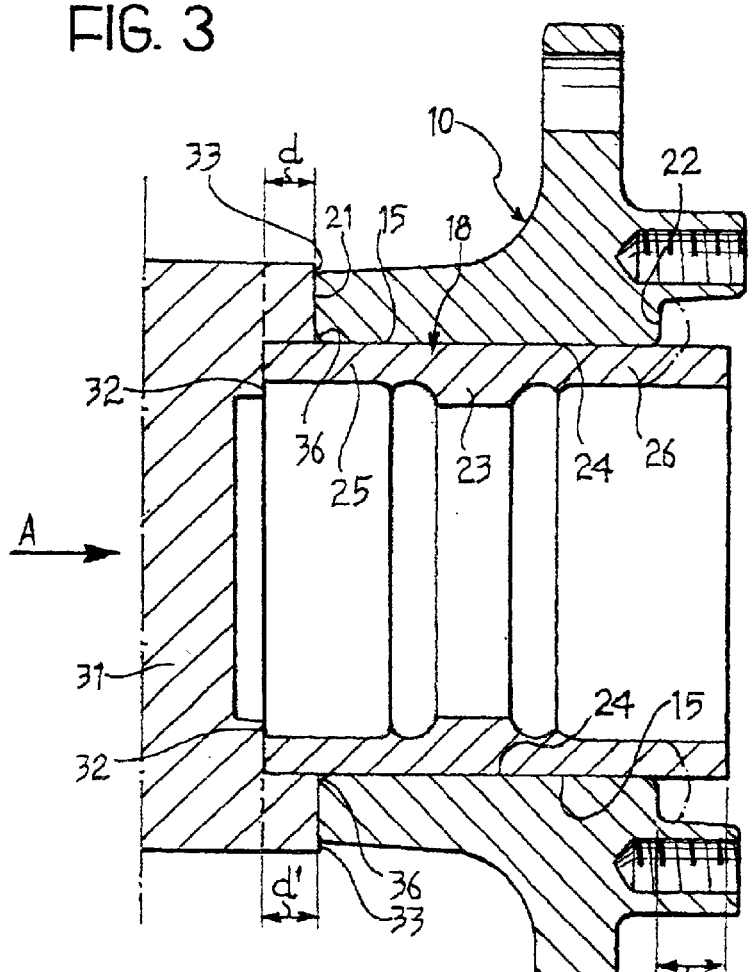
FIG. 3 shows a step of the assembling of the bearing on the hub.

In the preferred embodiment, in which some radial interference is provided between the cylindrical surface 24 of the outer ring 18 and the cylindrical seat 15 of the hub, the insertion of the ring 18 is forced. The insertion may for example be carried out by means of a tool 31, schematically shown in FIG. 3, where for simplicity only the outer ring 18 of the bearing has been shown, and not the whole bearing.

The tool 31 has a first axial abutment surface 32 and a second axial abutment surface 33, axially spaced from one another, by a predetermined distance d. The first abutment surface 32 urges the undeformed outer face 34 of the axially outer projection 25 in the axial direction indicated by arrow A, until the second axial abutment surface 33 abuts against a reference surface integral with the annular hub, in this case the outer side 21 of the hub itself. The distance d is set such that in the abutment arrangement shown in FIG. 3, the ends of the tubular projections 25 and 26 project, in the undeformed condition, before rolling, by respective distances d' and d" beyond the side surfaces 21 and 22 of the hub. The distances d' and d" may be equal or slightly different according to requirements, so as to allow to lock the bearing on the hub in any one of a plurality of different axial positions. In any case, the distances by which said undeformed ends project beyond the side surfaces 21 and 22 of the hub will be such to allow to form corresponding rolled end portions 25a and 26a (FIG. 2) effective in axially locking the bearing on the hub.

The rolling operations may indifferently be carried out simultaneously on the two projections, or, as an alternative, in two subsequent steps, opposing axial movements of the outer ring 18 by means of the same tool 31 used for setting the desired axial position of the outer ring with respect to the hub. In order to improve the locking of the bearing on the hub, it is advantageous to form on the hub, at the junction zones between the side surfaces 21 and 22 and the cylindrical seat 15, curved circumferential bevels or radiuses 36.

Figure 4:
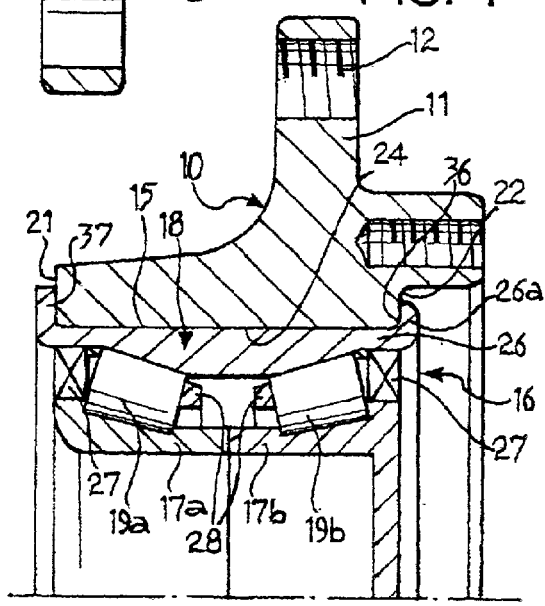
FIG. 4 is a partial axial cross-sectional view of a hub-bearing unit according to a second embodiment of the invention.

Referring now to FIG. 4, according to an alternative embodiment of the invention the outer ring 18 of the bearing has only one tubular projection 26 axially extending from the inboard side of the ring, while on its outboard side the ring 18 forms an axial shoulder 37 which abuts against the side surface 21 of the hub. Once the outer ring has been inserted in the cylindrical seat 15 of the hub, preferably in a forced manner, and upon reaching the abutment of the shoulder 37 against the side surface 21, the portion 26a of the tubular projection 26 projecting beyond the side surface 22 of the hub is cold deformed in a radially outer direction against the surface 22, thereby locking the bearing in the hub.

As it will be appreciated, with respect to the prior art, the present invention allows to reduce the overall axial bulk of the hub-bearing unit; in particular, the hub may be made axially thinner and requires no machining to form the conventional axial shoulder indicated 10a in FIG. 1. The reduction of axial bulk involves therefore a consequent reduction of weight.

The invention allows advantageously to manufacture the hub in a different material from steel conventionally used. In the preferred embodiment, the annular hub 10 is completely made of aluminium. This material is known to be lighter than steel, but also weaker, and would not be suitable to withstand high local stresses in the zones of the conventional abutments and grooves or threads for axially locking the bearing. The use of an aluminium hub therefore allows a further weight reduction.

Naturally, the principle of the invention remaining the same, the details of construction may be varied with respect to what has been described in the above discussed examples. In particular, it will be possible to form a plurality of radial recesses (or protrusions) in one or both the end portions of the cylindrical seat 15. Such radial recesses or protrusions bring about a form coupling of the axial rolled end portions 25a and 26a so as to improve the rotational locking of the outer ring 18 with respect to the annular hub 10.

What claimed is:

1. A hub-bearing unit for a motor vehicle wheel, the unit comprising:

a radially outer annular hub made of aluminum adapted for connection to the wheel of a vehicle, and having a central axial cylindrical seat for a bearing;

a bearing having a radially outer rotating ring mounted in the cylindrical axial seat for rotating fast with the annular hub;

wherein the outer ring has an axial width greater than the axial width of the cylindrical seat, the outer ring comprises at least one tubular projection extending axially front one side of the outer ring, and wherein the tubular projection comprises an end portion projecting beyond a side surface of the hub and cold deformed in a radially outer direction towards said side surface, so as to lock the outer ring on the hub.

2. The hub-bearing unit of claim 1, comprising two tubular projections axially extending from either sides of the outer ring of the bearing, wherein both tubular projections each comprise an end portion projecting beyond a respective side surface of the hub and cold deformed in a radially outer direction towards said respective opposite side surfaces, so as to lock the outer ring on the hub.

3. The hub-bearing unit of claim 1, wherein the outer ring has a tubular projection extending axially from a first side of the outer ring and comprising an end portion projecting beyond a first side surface of the annular hub and cold deformed in a radially outer direction towards said first side surface so as to lock the outer ring on a first side of the hub, and an axial shoulder abutting against a second side surface of the hub.

4. The hub-bearing unit of claim 1, wherein the outer ring of the bearing has a cylindrical outer surface fixed with radial interference in the cylindrical seat of the hub.

* * * * *